United States Patent [19]
Todd, Jr.

[11] Patent Number: 6,099,879
[45] Date of Patent: Aug. 8, 2000

[54] METHOD FOR PREVENTING OFF-FLAVOR DEVELOPMENT AND PRESERVING SEASONING FLAVOR IN IRRADIATED MEAT AND MEAT PRODUCTS

[75] Inventor: Paul H. Todd, Jr., Kalamazoo, Mich.

[73] Assignee: Kalamazoo Holdings, Inc., Kalamazoo, Mich.

[21] Appl. No.: 09/191,085

[22] Filed: Nov. 12, 1998

[51] Int. Cl.$^7$ ...................................................... A23L 3/005
[52] U.S. Cl. ........................ 426/240; 426/289; 426/541; 426/544; 426/521; 426/651
[58] Field of Search ............................ 426/240, 92, 541, 426/544, 654, 521, 289, 651

[56] References Cited

U.S. PATENT DOCUMENTS

| | | | |
|---|---|---|---|
| 2,832,689 | 4/1958 | Proctor et al. | |
| 3,493,397 | 2/1970 | Shults. | |
| 5,230,915 | 7/1993 | Shahidi et al. | 426/240 |
| 5,366,746 | 11/1994 | Mendenhall | 426/521 |
| 5,443,852 | 8/1995 | Shahidi et al. | 426/92 |

OTHER PUBLICATIONS

Ronald C. Deis, Food Product Design, Jun. 1998, pp. 99–105.
Donald W. Thayer in Journal of Food Protection 56, No. 10, 831–833 Oct. 1993 in the article entitled "Extending Shelf Life of Poultry and Red Meat by Irradiation Processing".
G. Maerker, Adv. Appl. Lipid Res. 1996, 2, pp. 95–141.
S. Sudarmadji and W.M. Urbain, J. Food Sci. 37, 671–2 (1972).
Huber et al., Food Tech. 1954, pp. 109–115.
Hannan Food Science Abstracts 1954, pp. 121–125.
Erdman and Watts Food Tech. 1957, pp. 349–353.
Diehl, Preservation of Food by Ionizing Radiation, E.S, Josephson and M.S. Peterson, eds., CRC Press, Boca Raton, FL, vol. 1, 1982, pp. 279–357.
Proctor et al., Food Tech. 1952, pp. 237–242.
Proctor et al., Food Tech. 1955, pp. 523–527.
Batzer and Doty, Agric. Food Chem. 1955, 3(1), pp. 64–67.
Lea, et al., J. Sci. Food Agric. 1960, 11, pp. 690–694.
Ahn et al., J. Food Sci. 1998, 63(1), pp. 15–19.
Kanatt et al., J. Food Sci. 1998, 63(2), pp. 198–200.

*Primary Examiner*—Nina Bhat
*Attorney, Agent, or Firm*—The Firm of Gordon W. Hueschen

[57] ABSTRACT

A method comprising the step of treating meat and meat products, including fish, poultry, fish products, and poultry products, with a stabilizing amount of rosemary extract or rosemary extract in combination singly or collectively with tocopherols, ascorbic acid, citric acid, or sodium tripolyphosphate, prior to exposure of the meat or meat products to ionizing radiation, enhances the flavor and shelf life thereof. In addition, the active antioxidant ingredients of rosemary extract may be used individually or collectively as a replacement for rosemary extract, these being carnosic acid, carnosol, and rosmarinic acid, which have been found equivalent to or superior to rosemary extract itself for purposes of the present invention when used in the concentrations set forth herein.

36 Claims, No Drawings

METHOD FOR PREVENTING OFF-FLAVOR DEVELOPMENT AND PRESERVING SEASONING FLAVOR IN IRRADIATED MEAT AND MEAT PRODUCTS

BACKGROUND OF THE INVENTION

1. Field of the Invention

A method comprising the step of treating meat and meat products, including fish, poultry, fish products, and poultry products, with a stabilizing amount of rosemary extract or rosemary extract in combination singly or collectively with tocopherols, ascorbic acid, citric acid, or sodium tripolyphosphate, prior to exposure of said meat or meat products to ionizing radiation, enhances the flavor and shelf life thereof. In addition, the active antioxidant ingredients of rosemary extract may be used individually or collectively as a replacement for rosemary extract, these being carnosic acid, carnosol, and rosmarinic acid, which have been found equivalent to or superior to rosemary extract itself for purposes of the present invention when used in the specified concentrations as hereinafter set forth.

According to the present invention, such prior addition of rosemary extracts in combination singly or multiply with tocopherols, ascorbic acid, citric acid, or sodium tripolyphosphate to meat, fish, poultry, meat products, fish products or poultry products:

1) dramatically diminishes the development of characteristic radiation-induced "wet dog, burnt or metallic" off-flavors,
2) delays the onset of oxidative rancidity during and subsequent to irradiation,
3) greatly retards the development of meat flavor deterioration (warmed over flavor) when the substrate is later cooked, stored in a refrigerated state, and reheated, and
4) preserves the seasoning flavor if the meat, fish, poultry, meat product, fish product, or poultry product is flavored with spices and/or herbs in whole, ground, or extracted form.

The present invention accomplishes all these benefits without compromising the intended purpose of food irradiation, namely, increasing food safety by decreasing the population of microorganisms in the substrate.

2. Prior Art

The ability of ionizing energy to preserve foods from microbial spoilage is well known and documented in the literature. The use of this technology is being driven by increasing incidents of sickness and death caused by food-borne pathogens. As many as 9000 deaths, annually, are believed to be caused by food-borne bacteria in the United States (Ronald C. Deis, Food Product Design, June 1998, pp. 99–105). Irradiation of meats is the only current commercially viable technology that can destroy all harmful bacteria on or in a raw product. The matter has been considered by Donald W. Thayer in Journal of Food Protection 56, No. 10, 831–833 (October 1993) in the article entitled "Extending Shelf Life of Poultry and Red Meat by Irradiation Processing".

The principles of radiation sterilization are ably summarized in a review by G. Maerker (Adv. Appl. Lipid Res. 1996, 2, pp. 95–141). Two types of radiation are currently employed for foods, gamma-radiation and electron beams. Said radiation exposure usually occurs in the temperature range of −196 deg. C to 20 deg. C. Though differing in certain important aspects, in each case energy is transferred into the food product with the resultant formation of high energy oxidants and reductants. The most important of these in foods with relatively high water content (such as meats) are the hydroxyl radical and the hydrogen atom, which result from the dissociation of water. Other active materials formed in the radiolysis of water include hydrated electrons, hydrogen peroxide, and hydronium ion. These active species are responsible for the anti-microbial action of irradiation, but are also responsible for some adverse chemical effects in the irradiated foods, including development of off-flavors and aromas and a decrease in oxidative stability in subsequent storage. Methods to overcome these difficulties will have to be developed before irradiation of meats will be accepted by consumers. Although there is significant prior art directed at solving the problems associated with irradiation of meats and meat products, the prior art does not in any way disclose or suggest the solution provided by the present invention.

Problems to Be Solved

Problem 1. Prevention of Immediate Post-irradiation Off-flavor Development.

Irradiation of meats often has an immediate negative impact on palatability, depending on the dose used. Meats or meat products which have been irradiated often acquire a characteristic odor and flavor which has been described as "irradiation burned, wet dog, or metallic". The higher the dose, the greater the generation of off-flavors and aromas. Irradiation at high doses required for sterilization may make the product unpalatable. The dose required for the development of these off-flavors differs depending on the type of meat being irradiated. Some types of meat are more resistant to the formation of radiation-induced off-flavor development than others (S. Sudarmadji and W. M. Urbain, J. Food Sci. 37, 671–2 (1972)). Off-flavor development immediately after irradiation is a significant limiting factor in consumer acceptance of irradiated meats.

Several methods for reducing objectionable off odors and flavors associated with irradiated meats have been developed. Huber et al. (Food Tech. 1954, pp. 109–115) teach that freezing the meat and irradiating it at very low temperatures will reduce radiation-induced off-flavor and odors. There are obvious costs and logistical problems associated with this method. They also teach that irradiation in the absence of oxygen under vacuum or in the presence of an inert atmosphere is also beneficial. Later reports in the literature are sometimes contradictory, but the value of excluding oxygen is generally recognized. The combination of vacuum packaging and freezing has been demonstrated. Once again, costs associated with vacuum or inert atmosphere packaging can limit the use of this technology. Huber et al. also teach that storing the meat products at room temperature after irradiation is accompanied by a decrease in the levels of objectionable off-flavors and odors. This technique is only an option if a complete radiation sterilization has been achieved in hermetic packaging and even then is not completely successful. If, more commonly, a lower, non-sterilization dose is used (radurization), growth of surviving microorganisms will limit the amount of time the material can be stored at room temperature and the levels to which off-flavors may decline. Sterilization doses which are higher than those used for radurization are associated with increased radiation-induced off-flavor development.

Proctor and Goldblith (U.S. Pat. No. 2,832,689) have shown that initial radiation-induced off-flavor development can be lessened by the addition of a protecting substance comprising a free radical acceptor, and specify ascorbic acid derivatives as particularly effective. Hannan (Food Science Abstracts 1954, pp. 121–125) also describes the beneficial effects of ascorbic acid, but finds that post irradiation addition is nearly as effective as pre-irradiation addition. Erdman and Watts (Food Tech. 1957, pp. 349–353) warn that ascorbic acid acts as a pro-oxidant in cured meats. Diehl (Preservation of Food by Ionizing Radiation, E. S. Josephson and M. S. Peterson, eds., CRC Press, Boca Raton, Fla., Vol. 1, 1982, pp. 279–357 and references cited therein) reviews work in which addition of ascorbate was found to be ineffective. Hannan (cited previously) also teaches that nitrite effectively blocks irradiation off-flavor development. Huber et al. (cited previously) observed that pepper, mace, allspice, turmeric, celery, dill, caraway, thyme, onion and sage or extracts derived from them exhibit marked flavor protection qualities. No experimental evidence for this effect is included in their report. The patent literature contains an example which appears to refute the claim that black pepper blocks irradiation off-flavor development. Shults (U.S. Pat. No. 3,493,397) describes the use of pepper, sodium nitrite and sodium erythorbate as part of a frankfurter seasoning which fails to control irradiation off-flavor development, control being accomplished instead by the preliminary dehydration step. Huber (cited previously) also observed that press extracts of organ meats protected foods against adverse flavor changes caused by irradiation. Proctor et al. (Food Tech. 1952, pp. 237–242) teach that sodium isoascorbate is an effective chemical protector for pepsin in water (a meat model) and propose a radical acceptor mechanism to explain its effect. Niacin was found to be even more effective than ascorbate, which is surprising, since niacin is not known to be an effective radical acceptor. Other compounds which are not radical acceptors have also been found to be effective at preventing radiation-induced off-flavor development. In an excellent review, Maerker (cited previously) describes the use of mannitol, sodium benzoate and chloride ion in protecting liposomes (another meat model) from irradiation damage. Proctor et al. (Food Tech. 1955, pp. 523–527) show that sodium fumarate and monosodium glutamate protect ground beef from irradiation off-flavor, but the treatment is not effective in protecting whole muscle beef. The combination of MSG and sodium fumarate is not known to be an effective radical acceptor. Batzer and Doty (Agric. Food Chem. 1955, 3(1), pp. 64–67) teach that addition of glutathione, a well known biological antioxidant actually increases the formation of undesirable odors formed in gamma irradiation of beef. The free radical acceptor explanation is too simple to explain the all the observations. It can not explain the beneficial effects of compounds like mannitol, niacin, sodium fumarate and mono sodium glutamate which are not known to function as radical acceptors. In his review article, Diehl makes the statement on p. 289 that "the expectations expressed in some of the early publications on radiation sterilization, concerning the beneficial effect of the addition of free radical acceptors, have not been fulfilled in practice."

Problem 2. Prevention of Oxidation During Post-irradiation Storage.

Irradiated meat is prone to undergo oxidation reactions during post irradiation storage. This is a second factor limiting the acceptability of irradiated meat products. Lea, et al. (J. Sci. Food Agric. 1960, 11, pp. 690–694) teach that doses as low as 1 KiloGray (KGy) in beef greatly accelerated oxidation in subsequent storage. Radiation can be considered an initiator of an autoxidation process via formation of reactive intermediates. Hydroxyl radical is an extremely reactive oxidizing agent, reacting at diffusion controlled limits with almost anything that it encounters. It serves as a free radical initiator of the autoxidation process which leads ultimately to the formation of low molecular weight lipid oxidation products such as aldehydes and ketones which lead to rancid flavors and aromas. Reheating cooked meats generates a characteristic off-flavor known as warmed-over-flavor (WOF), more recently described as meat flavor deterioration.

Ahn et al. (J. Food Sci. 1998, 63(1), pp. 15–19) teach that vacuum packaging after irradiation and cooking greatly decreases oxidation in storage as measured by the thiobarbituric acid test. Kanatt et al. (J. Food Sci. 1998, 63(2), pp. 198–200) show that post irradiation oxidation in chicken meat can be lessened by treating the meat with antioxidants (butylated hydroxytoluene, sodium tripolyphosphate, sodium nitrite, tocopherol, ascorbic acid, or citric acid). Erdman and Watts (previously cited) warn that ascorbic acid acts as a pro-oxidant in cured meats unless combined with a liquid smoke flavoring. Rosemary extract is a known antioxidant in meat systems J. Loliger "Natural Antioxidants for the Stabilization of Foods" in Flavor Chemistry of Lipid Foods (D. B. Min and T. H. Smouse, eds., American Oil Chemist's Society, Champaign, Ill. (1989), pp. 302ff; and H. L. Madsen et al. "Antioxidant Activity of Spices and Spice Extracts" in Spices: Flavor Chemistry and Antioxidant Properties (S. J. Risch and C-T. Ho, eds.), ACS Symposium Series 660, American Chemical Society, Washington, D.C. (1996), pp. 176ff and p. 181 for the active antioxidant ingredients of rosemary extract. We have been unable to find any relevant literature regarding warmed over flavor in irradiated meats and meat products.

Problem 3. Preservation of Seasoning Flavor in Irradiated Seasoned Products.

We have identified a third problem associated with the irradiation of seasoned meat products, namely, the loss of seasoning flavor during irradiation and in the subsequent storage period. Since seasonings are an expensive component of a food system, loss of seasoning is an economically unacceptable result.

To our knowledge, there is nothing in the prior art that suggests a remedy for this problem or even that it could be solved.

The prior art does not disclose or suggest the solution to these problems which is provided by the present invention. Although the selection of rosemary extract may at first blush appear to be an obvious extension of the art of Huber, previously cited, in that rosemary is a spice (although rosemary is not mentioned in Huber's extensive list of spices), a careful examination of the present invention, particularly as set forth in the examples, will show that the use of rosemary extracts as disclosed provides surprising and unpredictable benefits. It is not obvious that the use of rosemary extracts according to the present invention and as disclosed in this application would provide all the benefits of lessening the formation of irradiation-induced off-flavor formation, enhancing the oxidative shelf-life of meat products during post-irradiation storage, preventing the formation of warmed-over-flavor (meat flavor deterioration) in reheated, cooked, irradiated products, and preserving the seasoning flavor of seasoned meat products. Whereas an extract of the spice black pepper or celery, as disclosed by Huber (cited previously) and confirmed in our laboratory is indeed able to lessen the development of immediate off-flavors associated with radiation treatment of meat products, it is unable to provide the added, necessary benefit of enhancing the oxidative shelf-life of the meat or meat product during post irradiation storage. Moreover, black pepper extract or celery extract are not able to prevent meat flavor deterioration ("warmed over flavor") which occurs when a cooked, irradiated product is reheated and neither are they able to preserve seasoning flavor in an irradiated, seasoned meat product. It is this unique combination of unobvious benefits which is provided by the present invention.

OBJECTS OF THE INVENTION

It is an object of the present invention to provide a new and improved method for controlling the formation of objectionable off-flavors and odors which can occur immediately after meat or meat products, e.g., meats, fish, poultry, meat products, fish products, or poultry products, are subjected to ionizing radiation for the purpose of radurization or sterilization, the said method being the treatment of meats, fish, poultry, meat products, fish products or poultry products with rosemary extracts or rosemary extracts in combination singly or multiply with tocopherols, ascorbic acid, citric acid, or sodium tripolyphosphate, prior to exposure of the same to ionizing radiation.

Another object of the invention is to provide a method of delaying the onset of oxidative rancidity during storage of meat, fish, poultry, meat products, fish products, or poultry products subsequent to irradiation, employing rosemary extracts or rosemary extracts in combination singly or multiply with tocopherols, ascorbic acid, citric acid, or sodium tripolyphosphate prior to exposure of said meat, fish, poultry, meat products, fish products, or poultry products to ionizing radiation.

Yet another object of the invention is a method for preserving the seasoning flavor of a seasoned meat, fish, poultry, meat product, fish product, or poultry product by employing rosemary extracts or rosemary extracts in combination singly or multiply with tocopherols, ascorbic acid, citric acid, or sodium tripolyphosphate prior to exposure of said seasoned meat, fish, poultry, meat product, fish product, or poultry product to ionizing radiation.

Still another object of this invention is a method of retarding the development of meat flavor deterioration (warmed over flavor) in irradiated meat, fish, poultry, meat products, fish products, or poultry products which are cooked and then reheated, by employing rosemary extracts or rosemary extracts in combination singly or multiply with tocopherols, ascorbic acid, citric acid, or sodium tripolyphosphate prior to exposure of said meat, fish, poultry, meat products, fish products, or poultry products to ionizing radiation.

Yet an additional object is the provision of such a method as set forth in the foregoing wherein the rosemary extract is partially or completely replaced by one or more of the active antioxidant ingredients of rosemary extract, namely, carnosic acid, carnosol, and rosmarinic acid. Still other objects will become apparent hereinafter and yet additional objects will be obvious to one skilled in the art to which this invention pertains.

SUMMARY OF THE INVENTION

What I believe to be my invention, then, inter alia, comprises the following, singly or in combination:

A method for reducing the development of radiation induced off-flavors and aromas, delaying the onset of oxidative rancidity during storage, retarding development of meat flavor deterioration or warmed-over flavor upon cooking and reheating, and for preserving the flavor of seasonings present, in meat or a meat product which is treated with ionizing radiation, comprising the step of incorporating a stabilizing amount of rosemary extract or an active antioxidant ingredient thereof in the meat or meat product prior to treatment thereof with ionizing radiation; such a method in which the meat or meat product is also frozen prior to exposure to radiation and said radiation exposure occurs in the temperature range of −196 deg. C to 0 deg. C.; such a method in which the rosemary extract concentration ranges from about 50 ppm to about 5000 ppm based on total weight of the meat or meat product; such a method in which the radiation is gamma radiation or high energy electrons produced by an electron beam device; such a method wherein the meat or meat product treated is cured prior to radiation; such a method in which the rosemary extract is incorporated by injection, dipping, painting, vacuum tumbling, marination, spraying, or mixing; such a method in which the rosemary extract is an oleoresin rosemary from which some of the volatile oil has been removed; such a method in which the rosemary extract is emulsified with one or more of lecithins, mono and diglycerides, diacetyltartaric acid esters of mono- and diglycerides, and sorbitan esters, singly or in admixture; such a method in which the rosemary extract is dissolved or dispersed in propylene glycol, ethanol, or vegetable oil; such a method in which oxygen is excluded during subsequent storage of the meat or meat product; such a method wherein the rosemary extract is incorporated into the meat or meat product together with one or more of sodium tripolyphosphate, ascorbic acid, citric acid, and tocopherol, singly or in admixture; and such a method in which the rosemary extract concentration ranges from about 50 ppm to about 5000 ppm based on total weight of the meat or meat product, the ascorbic acid concentration ranges from about 20 ppm to about 400 ppm based on total weight of the meat or meat product, the tocopherol concentration ranges from about 50 ppm to about 500 ppm based upon total weight of the meat or meat product, the citric acid concentration ranges from about 20 ppm to about 400 ppm based upon total weight of the meat or meat product, and the sodium tripolyphosphate concentration ranges from about 50 ppm to about 400 ppm based upon total weight of the meat or meat product.

Also, a method for reducing radiation induced off-flavors and aromas, oxidative rancidity, development of warmed-over flavor, and for preserving the flavor of seasonings present, in meat or a meat product which is treated with ionizing radiation, comprising the step of incorporating a stabilizing amount of a compound selected from the group consisting of carnosic acid, carnosol, and rosmarinic acid, either singly or in combination or admixture, in the meat or meat product prior to treatment thereof with ionizing radiation; such a method in which sufficient carnosic acid and/or carnosol and/or rosmarinic acid is incorporated into the meat or meat product so as to effect a final concentration in the irradiated meat or meat product as follows:
carnosic acid—about 25 ppm to about 200 ppm
carnosol—about 5 ppm to about 500 ppm
rosmarinic acid—about 20 ppm to about 400 ppm; and such a method wherein the carnosic acid, carnosol, or rosmarinic acid is dissolved or dispersed in propylene glycol, ethanol, or a vegetable oil.

Moreover, a method for preserving the flavor of seasonings, whether whole, ground, or extracted spices and/or herbs, present in meat or a meat product which is treated with ionizing radiation, comprising the step of incorporating a stabilizing amount of rosemary extract or an active antioxidant ingredient thereof in the meat or meat product prior to treatment thereof with ionizing radiation; and such a method wherein the rosemary extract is incorporated into the meat or meat product together with one or more of sodium tripolyphosphate, ascorbic acid, citric acid, and tocopherol, either singly or in admixture.

Further, a method for preserving the flavor of seasonings, whether whole, ground, or extracted spices and/or herbs, present in meat or a meat product which is treated with ionizing radiation, comprising the step of incorporating a stabilizing amount of a compound selected from the group consisting of carnosic acid, carnosol, and rosmarinic acid, either singly or in combination or admixture, in the meat or meat product prior to treatment thereof with ionizing radiation; such a method in which sufficient carnosic acid and/or carnosol and/or rosmarinic acid is incorporated into the meat or meat product so as to effect a final concentration in the irradiated meat or meat product as follows:
carnosic acid—about 25 ppm to about 200 ppm
carnosol—about 5 ppm to about 500 ppm
rosmarinic acid—about 20 ppm to about 400 ppm; and such a method wherein the carnosic acid, carnosol, or rosmarinic acid is dissolved or dispersed in propylene glycol, ethanol, or a vegetable oil.

Finally, any such method wherein the meat or meat product treated is cooked prior to irradiation, or frozen prior to irradiation, or cooked and then frozen prior to irradiation.

THE PRESENT INVENTION

According to the present invention, the surprising protective effect of the rosemary extract or a mixture of rosemary extract or one or more of its antioxidant ingredients, singly or multiply with ascorbic acid, sodium tripolyphosphate, citric acid, or tocopherols, when applied to meat or meat products, i.e., meat, fish, poultry, meat products, fish products, or poultry products, prior to subjecting said meat or meat products to ionizing radiation, is demonstrated by the following Examples.

According to the present invention, the active materials or their admixtures or combinations may be applied to the meat, fish, or poultry by injection, vacuum tumbling, marination, spraying, painting, or dipping. In the case of comminuted meat, fish, or poultry products, the admixtures or combinations may be mixed directly with the ground material.

A preferred form of rosemary is a rosemary oleoresin or extract in which a portion of the volatile oil has been removed in order to avoid overwhelming the meat products with rosemary flavor. In another preferred form of this invention, the rosemary oleoresin may be blended with food-grade emulsifiers such as lecithins, mono and diglycerides, diacetyltartaric acid esters of mono- and diglycerides, or sorbitan esters, to enhance dispersibility in the meat product. Another preferred form of the invention consists of the use of the active antioxidant ingredients of rosemary extract in purified form, namely, carnosic acid, carnosol, and rosmarinic acid, singly or in admixture, especially when dissolved or dispersed in a carrier such as propylene glycol, ethanol, a vegetable oil, or like edible carrier at concentrations between 10 and 50% solids. In a less preferred form, the rosemary extract is a full-flavored oleoresin.

The active materials and especially the combinations or admixtures of the invention, are useful in a wide range of meat, fish, poultry, meat products, fish products, and poultry products, and one of the advantages stems from the fact that a single additive formulation serves to hinder off-flavor development caused by irradiation, enhances the product's oxidative shelf-life, helps prevent warmed over flavor in reheated applications, and can preserve expensive seasoning flavor in the finished product.

When employing a composition of the invention, the essential ingredients, namely, the rosemary extract or one or more of its active antioxidant ingredients, citric acid, ascorbic acid, tocopherols, and sodium tri-polyphosphate can advantageously be used in the following amounts:

The rosemary extract ranging from about 50 ppm to about 5000 ppm based on total weight of the meat or meat product.

The ascorbic acid, especially of less than 30 micron diameter (e.g., Ascorbalox® from Kalsec, Incorporated, Kalamazoo, Mich.), ranging from about 20 ppm to about 400 ppm based on total weight of the meat or meat product.

The tocopherols ranging from about 50 ppm to about 500 ppm based upon total weight of the meat or meat product.

The citric acid ranging from about 20 ppm to about 400 ppm based upon total weight of the meat or meat product.

The sodium tripolyphosphate ranging from about 50 ppm to about 400 ppm based upon total weight of the meat or meat product.

The carnosic acid from about 25 ppm to about 200 ppm based upon total weight of the meat or meat product.

The carnosol from about 5 ppm to about 500 ppm based upon total weight of the meat or meat product.

The rosmarinic acid from about 20 ppm to about 400 ppm based upon total weight of the meat or meat product.

DETAILED DESCRIPTION OF THE INVENTION

The following Examples are given by way of illustration only, and are not to be construed as limiting.

EXAMPLE 1

Showing the Effect of Additives in Preventing Off-flavor Development in Irradiated Beef A series of samples as shown below was prepared from fresh ground chuck purchased from a local butcher shop These samples were:

1. A non-irradiated ground beef control (no additives, no radiation).
2. an irradiated ground beef control (no additives, 4.5 KGy gamma irradiation).
3. ground beef containing 0.2% rosemary extract (Herbalox®, Kalsec, Incorporated).
4. ground beef containing 0.2% of rosemary extract plus 0.25% of a water solution of sodium tri polyphosphate.
5. ground beef containing 0.2% of a mixture of ascorbic acid, rosemary extract, citric acid and mixed tocopherols (Duralox®, Kalsec, Incorporated).
6. ground beef containing 0.2% black pepper extract.
7. ground beef containing 0.2% celery extract.

The ground meat samples were placed into one-pint mason jars in aliquots of 0.5 lbs. per jar, such that there were eight identical jars for each treatment. No attempt was made to remove or replace the air from the headspace of the jars. The meat was transported to a licensed radiation facility, irradiated and returned the same day. All samples, except the non-irradiated control, were subjected to 4.5 KGy of gamma radiation from a cobalt-60 source. Radiation doses were determined using a dosimeter. The meat was refrigerated during transport. Samples of ground beef from each treatment were cooked using a broiler pan seven days following irradiation and were evaluated for palatability or preference by a trained sensory panel using a scale of 0 to 5, where 0=inedible and 5=tasty. The results are shown in Table 1.

TABLE 1

Sensory panel scores on irradiated gound beef
(0 = inedible and 5 = tasty).
Score ± standard deviation is reported.

| Treatment | Cooked on Day 7 |
|---|---|
| Non-irradiated Control | 4.8 ± 0.4 |
| Irradiated Control | 1.0 ± 1.4 |
| Rosemary Extract | 3.3 ± 1.1 |
| Rosemary + sodium tripolyphosphate | 2.8 ± 0.4 |
| Rosemary + ascorbic acid + citric acid + tocopherols | 3.5 ± 0.7 |
| Black Pepper | 3.1 ± 1.1 (Day 2) |
| Celery | 2.9 ± 1.3 (Day 2) |

The results show that all the additives are effective in helping to prevent the initial burnt off-flavor development in irradiated ground beef. The irradiated control, however, became unpalatable due to the severe off-flavor that developed after irradiation.

EXAMPLE 2

Showing the Effect of Additives on the Oxidative Stability of Irradiated Ground Beef Uncooked samples from Example 1 were analyzed on days 2, 7, 10, 15, 22, 29, and 37 following irradiation using the TBA test, which is a standard test for oxidation products using thiobarbituric acid (J. B. Rossell, "Measurement of Rancidity", pp 32,33 in "Rancidity in Foods", 2nd Ed, Elsevier Science Publishers Ltd. (1989), giving as a resulting value the mg. of TBA per kg. of meat (the lower the least oxidation). The results are shown in Table 2.

TABLE 2

Effect of Additives on TBA values

| Treatment | Day 2 | Day 7 | Day 10 | Day 15 | Day 22 | Day 29 | Day 37 |
|---|---|---|---|---|---|---|---|
| Non-irradiated Control | 1.3 | 3.1 | 1.3 | 2.7 | 1.9 | 1.4 | 1.7 |
| Irradiated Control | 2.1 | 4.1 | 3.3 | 6.5 | 5.1 | 5.1 | 4.3 |
| Rosemary Extract | 0.6 | 0.9 | 0.6 | 1 | 0.6 | 0.8 | 1.8 |
| Rosemary + sodium tripolyphosphate | 0.7 | 1.1 | 2 | 1.6 | 1.8 | 1.9 | 0.9 |
| Rosemary + ascorbic acid + citric acid + tocopherols | 0.7 | 0.7 | 0.7 | 0.6 | 2.1 | 0.7 | 1.4 |

TABLE 2-continued

Effect of Additives on TBA values

| Treatment | Day 2 | Day 7 | Day 10 | Day 15 | Day 22 | Day 29 | Day 37 |
|---|---|---|---|---|---|---|---|
| Black pepper extract | 0.6 | 2.1 (day 8) | — | 2.8 | 3.3 | 1.5 | 3.5 (day 36) |
| Celery extract | 1.2 | 1.4 (day 8) | — | 1.5 | 1.6 | 1.8 | 4.2 (day 36) |

The data shows that rosemary extract is remarkably effective in controlling oxidation which occurs both during irradiation and during post irradiation storage of fresh ground beef. The effect of the rosemary extract is enhanced in the long term by the addition of sodium tripolyphosphate or a combination of ascorbic acid, citric acid, and mixed tocopherols. In the long term, black pepper and celery extract are not effective at controlling oxidation in this system.

EXAMPLE 3

Showing the Effect of Additives on Development of Meat Flavor Deterioration (warmed over flavor) in Irradiated Around Beef Samples of raw ground beef which had been subjected to the additive treatments described in Example 1 and irradiated at 4.5 KGy were cooked and tasted after 2 or 7 days, then held in a refrigerator for 3 or 4 days, after which they were reheated and tasted, all tasting being by a trained sensory panel. Samples were graded as to the presence of warmed over flavor on a hedonic scale of 0–5, with 5 being the highest warmed over flavor. The results are listed in Table 3.

TABLE 3

The effect of additives on the development of warmed over flavor. WOF Scores 0 = no warmed over flavor, 5 = high degree of warmed over flavor.

| Treatment | Cooked Day 2 | Cooked Day 2, refrigerated 4 days and reheated | Cooked Day 7 | Cooked Day 7, refrigerated 3 days and reheated |
|---|---|---|---|---|
| Non-irradiated Control | 1.6 ± 1.8 | 1.9 ± 0.7 | 1.2 ± 1.4 | 2.4 ± 0.8 |
| Irradiated Control | 1.7 ± 1.1 | 2.4 ± 1.0 | 1.6 ± 0.6 | 2.6 ± 1.1 |
| Rosemary Extract | 1.4 ± 1.0* | 1.6 ± 1.1* | 1.3 ± 0.8* | 1.8 ± 1.0* |
| Rosemary + sodium tripolyphosphate | 0.9 ± 1.2 | 1.9 ± 1.0 | 1.5 ± 0.5* | 1.4 ± 0.7* |
| Rosemary + ascorbic acid + citric acid + tocopherols | 1.2 ± 1.2 | 1.7 ± 1.0 | 1.6 ± 0.9* | 1.5 ± 0.6* |
| Black Pepper* | 1.1 ± 1.0 | 2.6 ± 0.4 | 1.0 ± 0.1 | 2.3 ± 0.7 |
| Celery* | 1.5 ± 1.6 | 3.2 ± 1.8 | 0.9 ± 0.1 | 3.1 ± 1.2 |

*Black Pepper plus Celery extracts - (day 8, refrigerated 5 days and reheated).

This example shows that all the additives, with the exception of black pepper and celery extracts, have an impact in controlling the warmed over flavor that develops in a cooked, irradiated ground beef product. Rosemary is particularly effective in preventing the formation of warmed over flavor.

The ideal outcome would be an initial low score which remains unchanged upon storage and reheating. The asterisks indicate "excellent".

EXAMPLE 4

Showing that the Additive Treatments Did Not Interfere with the Radurization Process in Ground Beef Portions of the raw samples prepared and irradiated in Example 1 were sent to a private, certified microbiological laboratory for microbiological testing. The results are shown in Table 4.

TABLE 4

Microbiological Testing Results on Irradiated Beef Samples.

| Treatment | Aerobic Plate Count/g | Anerobic Plate Count/g | Coliforms/g |
| --- | --- | --- | --- |
| Non-irradiated Control | 270,000 | 150,000 | 4,900 |
| Irradiated Control | <10 | <10 | <10 |
| Rosemary Extract | 10 | 10 | <10 |
| Rosemary + ascorbic acid + citric acid + tocopherols | <10 | <10 | <10 |

EXAMPLE 5

Showing the Effectiveness of Rosemary Extract in Preserving Seasoning Flavor in a Seasoned Ground Turkey Patty Ground turkey meat purchased from a local grocery store was separated into two batches and each batch was separately seasoned with one of two liquid sausage-type seasoning formulations. The first seasoning formulation contained black pepper extract, sage extract, white pepper extract, and capsicum extract. The second formulation contained black pepper extract, sage extract, white pepper extract, capsicum extract and a commercial rosemary extract. Prior to testing, the finished, freshly cooked products (without irradiation) from each formulation were tasted and found to be indistinguishable. The ground meat was formed into meatballs of approximately one inch in diameter. Half of each sample was cooked prior to irradiation at a dosage of 3 KGy and the other half was irradiated prior to being cooked. The four treatments were evaluated by a trained taste panel for retention of seasoning flavor. The order of retained seasoning flavor was:

1. Fifty-five percent of the panelists chose the sample with rosemary extract that had been irradiated raw and then cooked as having the highest amount of retained seasoning flavor.
2. Seventeen-and-a-half percent of the panelists chose the sample without rosemary extract that had been irradiated raw and then cooked as having the highest amount of retained seasoning flavor.
3. Seventeen-and-a-half percent of the panelists chose the sample without rosemary extract that had been cooked and then irradiated as having the highest amount of retained seasoning flavor.
4. Ten percent of the panelists chose the sample with rosemary extract that had been cooked and then irradiated as having the highest amount of retained seasoning flavor.

EXAMPLE 6

Showing the Effect of Additives in Preventing Off-flavor Development in Irradiated Pork Approximately 10 lbs. of fresh ground pork was obtained from a local market and used to prepare a series of samples:

1. A non-irradiated ground pork control (no additives, no radiation)
2. An irradiated ground pork control (no additives, 4.5 KGy gamma irradiation)
3. Ground pork containing 0.2% rosemary extract
4. Ground pork containing 0.2% rosemary extract plus 0.25% sodium tripolyphosphate One half pound samples and five fifty-gram samples were prepared. The ground meat samples were placed into glass jars. No attempt was made to remove or replace the air from the headspace of the jars. The samples were delivered, refrigerated, to a commercial radiation facility, irradiated at 4.5 KGy and returned, still refrigerated, the next day. Samples of ground pork from each treatment were cooked using a broiler pan six days following irradiation and were evaluated for palatability or preference by a trained sensory panel using a scale of 0 to 5, where 0=inedible and 5=tasty. The results are shown in Table 5.

TABLE 5

Sensory panel scores on irradiated ground pork (0 = inedible and 5 = tasty). Score ± standard deviation is reported.

| Treatment | Day 6 |
| --- | --- |
| Non-irradiated Control | 2.5 ± 1.4 |
| Irradiated Control | 1.4 ± 0.7 |
| Rosemary Extract | 3.0 ± 0.7 |
| Rosemary + Sodium Tri-polyphosphate | 3.2 ± 0.7 |

EXAMPLE 7

Showing the Effect of Rosemary Extract on Increasing the Oxidative Stability of Irradiated Pork During Subsequent Storage Uncooked samples from Example 6 were analyzed on days 6 through 48 following irradiation using the TBA test. The results are shown in Table 6.

TABLE 6

The effect of the additives on TBA values in irradiated ground pork.

| Treatment | Day 6 | Day 13 | Day 20 | Day 27 | Day 34 | Day 48 |
| --- | --- | --- | --- | --- | --- | --- |
| Non-irradiated Control | 0.4 | 0.8 | 0.9 | 0.7 | 0.6 | 1.0 |
| Irradiated Control | 0.9 | 2.0 | 2.1 | 2.2 | 2.2 | 2.4 |
| Rosemary Extract | 0.2 | 0.4 | 0.4 | 0.7 | 0.5 | 0.9 |
| Rosemary + Sodium Tripolyphosphate | 0.4 | 0.6 | 0.6 | 0.5 | 0.8 | 1.0 |

EXAMPLE 8

Showing the Effect of Rosemary Extract on Decreasing Radiation-induced Off-flavor Development and Increasing the Oxidative Stability of Irradiated Fish During Subsequent Storage Ground fish is separated into three samples. The first sample is treated with an oleoresin rosemary from which a portion of the essential oil is removed and which is emulsified with a mixture of lecithin and diacetyl tartaric acid esters of mono and diglycerides such that the concentration of the rosemary extract is 2000 ppm based upon the total weight of the fish. The second sample is treated with a mixture of oleoresin rosemary from which a portion of the essential oil is removed, together with ascorbic acid, tocopherol and citric acid, such that the concentration of the rosemary extract is 2000 ppm, the ascorbic acid is 200 ppm, the tocopherol is 200 ppm, and the citric acid is 50 ppm based upon total weight of the fish. The third sample is a control. The samples are irradiated at 4.5 KGy.

The samples are formed into patties, cooked on a broiler pan, and tasted by a trained taste panel. The treated samples are found to have much lower levels of radiation-induced off-flavor than the irradiated control.

Refrigerated, raw samples are evaluated every week for four weeks. At the end of each test period, the treated samples are found to have significantly lower TBA values than the irradiated control.

EXAMPLE 9

Showing the Effect of Carnosic Acid, Carnosol, and Rosmarinic Acid in Preventing Irradiation Induced Off-flavor Formation Ground chicken is separated into four samples. The first sample is treated with a 10% solution of carnosic acid in propylene glycol such that the final concentration of the carnosic acid is 100 ppm based on total meat weight. The second sample is treated with a 10% solution of carnosol in propylene glycol such that the final concentration of carnosol is 250 ppm based on total meat weight. A third sample is treated with a 4% solution of rosmarinic acid in propylene glycol such that the final concentration of rosmarinic acid is 400 ppm based on total meat weight. The fourth sample is a control. All the samples are irradiated at 3.5 KGy using a cobalt-60 source.

The samples are formed into meatballs and cooked on a broiler pan and evaluated by a trained taste panel. The samples containing the carnosic acid, carnosol, and rosmarinic acid are found to have much less radiation-induced off-flavor.

EXAMPLE 10

Showing the Effect of Rosemary Extract on Enhancing the Oxidative Stability of Raw Frozen Irradiated Meat Two pounds of ground beef was separated into two one-pound samples. One sample was treated with 0.2% of a commercial rosemary extract (Herbalox®, Kalsec, Incorporated) and the other sample was left as an untreated control. Each sample was formed into 15 meatballs weighing approximately 30 grams each. The meatballs were frozen, irradiated at 7 KGy using a Cobalt-60 source, and then stored in the frozen state in a plastic storage bag. A meatball was removed periodically, thawed, and analyzed for extent of oxidation using the TBA test. The results are shown in Table 7.

TABLE 7

TBA values of raw, frozen, irradiated ground beef samples.

| Treatment | TBA Value - Day 56 | TBA Value - Day 114 |
| --- | --- | --- |
| Irradiated Control | 1.4 | 1.7 |
| Rosemary Containing Sample | 0.7 | 1.1 |

The rosemary-treated sample shows significantly less oxidation than the control.

EXAMPLE 11

Showing the Effect of Rosemary Extract on Enhancing the Oxidative Stability of Cooked, Frozen, Irradiated Meat Two pounds of ground beef was separated into two one-pound samples. One sample was treated with 0.2% of the commercial rosemary extract and the other sample was left as an untreated control. Each sample was formed into 15 meatballs weighing approximately 30 grams each, and the meatballs were cooked on a broiler pan in a 350 deg. F. oven to an internal temperature of 160–170 deg. F. The cooked meatballs were frozen, irradiated at 7 KGy using a Cobalt-60 source, and then stored in the frozen state in a plastic storage bag. A meatball was removed periodically, thawed, and analyzed for extent of oxidation using the TBA test. The results are shown in Table 8.

TABLE 8

TBA values of cooked, frozen, irradiated ground beef samples.

| Treatment | TBA Value - Day 56 | TBA Value - Day 114 |
| --- | --- | --- |
| Irradiated Control | 4.0 | 3.8 |
| Rosemary Containing Sample | 2.0 | 1.7 |

The rosemary-treated sample shows significantly less oxidant than the control.

It is thereby seen from the foregoing that the objects of the present invention have been accomplished and that a novel, efficient, and economic method has been provided, all in accord with the Objects of the Invention and the Summary of Invention as set forth hereinbefore.

It is to be understood that the present invention is not to be limited to the exact details of operation, or to the exact compounds, compositions, methods, procedures, or embodiments shown and described, as various modifications and equivalents will be apparent to one skilled in the art, wherefore the present invention is to be limited only by the full scope which can be legally accorded to the appended claims, wherein the term "meat or meat products" is used in a generic sense and is understood to encompass meat, fish, poultry, meat products, fish products, and poultry products.

I claim:

1. A method for reducing the development of radiation induced off-flavors and aromas, delaying the onset of oxidative rancidity during storage, retarding development of meat flavor deterioration or warmed-over flavor upon cooking and reheating, and for preserving the flavor of seasonings present, in meat or a meat product which is treated with ionizing radiation, comprising the step of incorporating a stabilizing amount of rosemary extract or an active antioxidant ingredient thereof in the meat or meat product prior to treatment thereof with ionizing radiation.

2. The method of claim 1 in which the meat or meat product is also frozen prior to exposure to radiation and said radiation exposure occurs in the temperature range of −196 deg. C to 0 deg. C.

3. The method of claim 1 in which the rosemary extract concentration ranges from about 50 ppm to about 5000 ppm based on total weight of the meat or meat product.

4. The method of claim 1 in which the radiation is gamma radiation or high energy electrons produced by an electron beam device.

5. The method of claim 1 wherein the meat or meat product treated is cured prior to radiation.

6. The method of claim 1 in which the rosemary extract is incorporated by injection, dipping, painting, vacuum tumbling, marination, spraying, or mixing.

7. The method of claim 1 in which the rosemary extract is an oleoresin rosemary from which some of the volatile oil has been removed.

8. The method of claim 1 in which the rosemary extract is emulsified with one or more of lecithins, mono and diglycerides, diacetyltartaric acid esters of mono- and diglycerides, and sorbitan esters, singly or in admixture.

9. The method of claim 1 in which the rosemary extract is dissolved or dispersed in propylene glycol, ethanol, or vegetable oil.

10. The method of claim 1 in which oxygen is excluded during subsequent storage of the meat or meat product.

11. The method of claim 1 wherein the rosemary extract is incorporated into the meat or meat product together with one or more of sodium tripolyphosphate, ascorbic acid, citric acid, and tocopherol, singly or in admixture.

12. The method of claim 11 in which the meat or meat product is also frozen prior to exposure to radiation and said radiation exposure occurs in the temperature range of −196 deg. C to 0 deg. C.

13. The method of claim 11 in which the radiation is gamma radiation.

14. The method of claim 11 in which the radiation is high energy electrons produced by an electron beam device.

15. The method of claim 11 wherein the meat or meat product treated is cured prior to radiation.

16. The method of claim 11 in which the rosemary extract is incorporated by injection, dipping, painting, vacuum tumbling, marination, spraying, or mixing.

17. The method of claim 11 in which the rosemary extract is an oleoresin rosemary from which some of the volatile oil has been removed.

18. The method of claim 11 in which the rosemary extract is emulsified with one or more of lecithins, mono and diglycerides, diacetyltartaric acid esters of mono- and diglycerides, and sorbitan esters, singly or in admixture.

19. The method of claim 11 in which the rosemary extract is dissolved or dispersed in propylene glycol, ethanol, or a vegetable oil.

20. The method of claim 11 in which oxygen is excluded during subsequent storage of the meat or meat product.

21. The method of claim 11 in which the rosemary extract concentration ranges from about 50 ppm to about 5000 ppm based on total weight of the meat or meat product, the ascorbic acid concentration ranges from about 20 ppm to about 400 ppm based on total weight of the meat or meat product, the tocopherol concentration ranges from about 50 ppm to about 500 ppm based upon total weight of the meat or meat product, the citric acid concentration ranges from about 20 ppm to about 400 ppm based upon total weight of the meat or meat product, and the sodium tripolyphosphate concentration ranges from about 50 ppm to about 400 ppm based upon total weight of the meat or meat product.

22. A method for reducing radiation induced off-flavors and aromas, oxidative rancidity, development of warmed-over flavor, and for preserving the flavor of seasonings present, in meat or a meat product which is treated with ionizing radiation, comprising the step of incorporating a stabilizing amount of a compound selected from the group consisting of carnosic acid, carnosol, and rosmarinic acid, either singly or in combination or admixture, in the meat or meat product prior to treatment thereof with ionizing radiation.

23. The method of claim 22 in which sufficient carnosic acid and/or carnosol and/or rosmarinic acid is incorporated into the meat or meat product so as to effect a final concentration in the irradiated meat or meat product as follows:

carnosic acid—about 25 ppm to about 200 ppm carnosol—about 5 ppm to about 500 ppm rosmarinic acid—about 20 ppm to about 400 ppm.

24. The method of claim 23 wherein the carnosic acid, carnosol, or rosmarinic acid is dissolved or dispersed in propylene glycol, ethanol, or a vegetable oil.

25. A method for preserving the flavor of seasonings, whether whole, ground, or extracted spices and/or herbs, present in meat or a meat product which is treated with ionizing radiation, comprising the step of incorporating a stabilizing amount of rosemary extract or an active antioxidant ingredient thereof in the meat or meat product prior to treatment thereof with ionizing radiation.

26. The method of claim 25 wherein the rosemary extract is incorporated into the meat or meat product together with one or more of sodium tripolyphosphate, ascorbic acid, citric acid, and tocopherol, either singly or in admixture.

27. A method for preserving the flavor of seasonings whether whole, ground, or extracted spices and/or herbs, present in meat or a meat product which is treated with ionizing radiation, comprising the step of incorporating a stabilizing amount of a compound selected from the group consisting of carnosic acid, carnosol, and rosmarinic acid, either singly or in combination or admixture, in the meat or meat product prior to treatment thereof with ionizing radiation.

28. The method of claim 27 in which sufficient carnosic acid and/or carnosol and/or rosmarinic acid is incorporated into the meat or meat product so as to effect a final concentration in the irradiated meat or meat product as follows:

carnosic acid—about 25 ppm to about 200 ppm carnosol—about 5 ppm to about 500 ppm rosmarinic acid—about 20 ppm to about 400 ppm.

29. The method of claim 28 wherein the carnosic acid, carnosol, or rosmarinic acid is dissolved or dispersed in propylene glycol, ethanol, or a vegetable oil.

30. The method of claim 1 wherein the meat or meat product treated is cooked prior to irradiation.

31. The method of claim 1 wherein the meat or meat product treated is cooked and then frozen prior to irradiation.

32. The method of claim 11 wherein the meat or meat product treated is cooked prior to irradiation.

33. The method of claim 11 wherein the meat or meat product treated is cooked and then frozen prior to irradiation.

34. The method of claim 25 wherein the meat or meat product treated is frozen prior to irradiation.

35. The method of claim 25 wherein the meat or meat product treated is cooked prior to irradiation.

36. The method of claim 25 wherein the meat or meat product treated is cooked and then frozen prior to irradiation.

* * * * *